(12) United States Patent
Hutten

(10) Patent No.: US 10,700,944 B2
(45) Date of Patent: Jun. 30, 2020

(54) SENSOR DATA AGGREGATION SYSTEM

(71) Applicant: TapThere, Inc., Los Angeles, CA (US)

(72) Inventor: Curt Hutten, Laguna Beach, CA (US)

(73) Assignee: Wormhole Labs, Inc., Huntington Beach, CA (US)

(*) Notice: Subject to any disclaimer, the term of this patent is extended or adjusted under 35 U.S.C. 154(b) by 217 days.

(21) Appl. No.: 13/912,567

(22) Filed: Jun. 7, 2013

(65) Prior Publication Data

US 2013/0332603 A1    Dec. 12, 2013

Related U.S. Application Data

(60) Provisional application No. 61/656,619, filed on Jun. 7, 2012, provisional application No. 61/675,268, filed on Jul. 24, 2012, provisional application No. 61/675,263, filed on Jul. 24, 2012, provisional application No. 61/675,258, filed on Jul. 24, 2012, provisional application No. 61/675,271, filed on Jul. 24, 2012, provisional application No. 61/676,426, filed on Jul. 27, 2012, provisional application No. 61/676,431, filed on Jul. 27, 2012, provisional
(Continued)

(51) Int. Cl.
*H04L 29/08* (2006.01)
*H04L 12/24* (2006.01)
*H04W 4/38* (2018.01)

(52) U.S. Cl.
CPC ............. *H04L 41/50* (2013.01); *H04L 67/12* (2013.01); *H04L 67/02* (2013.01); *H04W 4/38* (2018.02)

(58) Field of Classification Search
CPC ......... H04L 43/04; H04L 41/50; H04L 67/12; H04L 67/02; H04W 4/38
USPC ......................... 709/204, 206, 207, 217, 219
See application file for complete search history.

(56) References Cited

U.S. PATENT DOCUMENTS 5,729,471 A    3/1998    Jain et al.
6,111,582 A    8/2000    Jenkins
(Continued)

FOREIGN PATENT DOCUMENTS

AU    2011211447    9/2011
CA    2425739    9/1998
(Continued)

OTHER PUBLICATIONS

Blumenthal, R., "Conference Caster Pro: Crowdsource your multi-camera video footage", https://code.google.com/p/conference-caster-pro, screen capture Jul. 25, 2013.
(Continued)

*Primary Examiner* — Viet D Vu
(74) *Attorney, Agent, or Firm* — Fish IP Law, LLP

(57) ABSTRACT

A sensor data aggregation system is presented. The aggregation system can include a sensor interface configured to obtain sensor data from multiple sensing devices (e.g., cell phone, security cameras, vehicles, etc.) associated with an event. An aggregation server compiles the sensor data into one or more event feeds representing a dynamic, immersive sensory experience of the event. The event feed can then be presented to one or more viewers where viewers can provide feedback to individuals operating the sensing devices. For example, a viewer can request a specific image or video be taken, possibly in exchange for a payment.

36 Claims, 9 Drawing Sheets

Related U.S. Application Data application No. 61/676,436, filed on Jul. 27, 2012, provisional application No. 61/676,443, filed on Jul. 27, 2012, provisional application No. 61/676,452, filed on Jul. 27, 2012.

(56) References Cited

U.S. PATENT DOCUMENTS

| | | | |
|---|---|---|---|
| 6,122,660 | A | 9/2000 | Baransky et al. |
| 6,694,352 | B1 | 2/2004 | Omoigui |
| 7,305,173 | B2 | 12/2007 | Karimoto et al. |
| 7,558,404 | B2 | 7/2009 | Ma et al. |
| 7,657,920 | B2 | 2/2010 | Arseneau et al. |
| 7,979,252 | B2 * | 7/2011 | Horvitz ............... G06F 9/4443 703/6 |
| 8,037,070 | B2 | 10/2011 | Maghoul |
| 8,081,636 | B2 | 12/2011 | den Hartog et al. |
| 8,250,616 | B2 | 8/2012 | Davis et al. |
| 8,286,218 | B2 | 10/2012 | Pizzurro et al. |
| 8,520,979 | B2 | 8/2013 | Conwell |
| 8,751,948 | B2 * | 6/2014 | Wetzer ................. G06F 9/542 455/414.2 |
| 2003/0073406 | A1 * | 4/2003 | Benjamin ............ G08G 1/0962 455/41.1 |
| 2003/0105794 | A1 | 6/2003 | Jasinschi et al. |
| 2006/0085392 | A1 | 4/2006 | Wang et al. |
| 2007/0130126 | A1 | 6/2007 | Lucovsky et al. |
| 2007/0180027 | A1 | 8/2007 | Boylan |
| 2007/0198485 | A1 | 8/2007 | Ramer et al. |
| 2008/0060029 | A1 | 3/2008 | Park et al. |
| 2008/0192736 | A1 | 8/2008 | Jabri et al. |
| 2009/0063419 | A1 | 3/2009 | Nurminen et al. |
| 2009/0153747 | A1 | 6/2009 | Grimes |
| 2009/0164559 | A1 | 6/2009 | Johnson et al. |
| 2010/0303448 | A1 | 12/2010 | Sariya et al. |
| 2011/0047464 | A1 | 2/2011 | McCarthy |
| 2011/0117934 | A1 | 5/2011 | Mate et al. |
| 2011/0153276 | A1 * | 6/2011 | Lee ...................... G06F 3/038 702/188 |
| 2011/0173214 | A1 | 7/2011 | Karim |
| 2011/0246276 | A1 * | 10/2011 | Peters ................. G06Q 30/02 705/14.24 |
| 2011/0249123 | A1 * | 10/2011 | Subbian .............. H04N 7/181 348/159 |
| 2011/0294569 | A1 | 12/2011 | Tone et al. |
| 2011/0307623 | A1 | 12/2011 | George et al. |
| 2012/0036242 | A1 * | 2/2012 | Wittenburg ......... H04L 67/12 709/222 |
| 2012/0039526 | A1 * | 2/2012 | Garaas ................ G06T 17/05 382/154 |
| 2012/0057459 | A1 | 3/2012 | den Hartog et al. |
| 2012/0059826 | A1 | 3/2012 | Mate et al. |
| 2012/0072938 | A1 | 3/2012 | Seong et al. |
| 2012/0096089 | A1 | 4/2012 | Barash et al. |
| 2012/0133638 | A1 * | 5/2012 | Davison ................ G06T 17/00 345/419 |
| 2012/0192242 | A1 | 7/2012 | Kellerer et al. |
| 2012/0233000 | A1 | 9/2012 | Fisher et al. |
| 2012/0265573 | A1 | 10/2012 | Van Pelt et al. |
| 2012/0275377 | A1 | 11/2012 | Lehane et al. |
| 2012/0278428 | A1 | 11/2012 | Harrison et al. |
| 2012/0284090 | A1 | 11/2012 | Marins et al. |
| 2012/0284145 | A1 | 11/2012 | Kalin et al. |
| 2012/0300046 | A1 | 11/2012 | Blayvas |
| 2013/0021433 | A1 * | 1/2013 | Belsarkar ............. H04N 7/18 348/36 |
| 2013/0040660 | A1 | 2/2013 | Fisher et al. |
| 2013/0079142 | A1 | 3/2013 | Kruglick |
| 2013/0086170 | A1 | 4/2013 | Skelton et al. |
| 2013/0120589 | A1 | 5/2013 | Gu et al. |
| 2013/0124496 | A1 | 5/2013 | Edgar et al. |
| 2013/0138716 | A1 * | 5/2013 | Macwan ............... G06Q 30/02 709/203 |
| 2013/0167190 | A1 * | 6/2013 | Jankowski ........... H04W 24/00 726/1 |
| 2013/0194304 | A1 * | 8/2013 | Latta ..................... G09G 3/003 345/633 |
| 2014/0022332 | A1 * | 1/2014 | Wang .................. H04M 3/567 348/14.07 |

FOREIGN PATENT DOCUMENTS

| | | |
|---|---|---|
| EP | 2398231 | 12/2011 |
| EP | 2402894 | 1/2012 |
| JP | 2012-4768 | 1/2012 |
| KR | 10-2005-0052859 | 6/2005 |
| KR | 10-2010-0069139 | 6/2010 |
| WO | 2008/017249 | 2/2008 |
| WO | 2011/004381 | 1/2011 |
| WO | 2012/054048 | 4/2012 |
| WO | 2012/122269 | 9/2013 |

OTHER PUBLICATIONS

"CrowdOptic Augmented Reality and Analytics Platform", CrowdOptic, 2013, www.crowdoptic.com.

Eagle, N., "Reality Mining", MIT Media Lab, 2009, http://reality.media.mit.edu/dataset.php, screen capture Jun. 5, 2012.

Green, K., "TR10: Reality Mining", Technology Review, Mar./Apr. 2008, http://www.technologyreview.com/printer_friendly_article.aspx?id=20247, screen capture Jun. 5, 2012.

O'Hear, S., "Calling All iPhoneographers—Foap Wants to Get You Paid", TechCrunch, Jun. 27, 2012, http://techcrunch.com/2012/06/27/calling-all-iphoneographers-foap-wants-to-get-you-paid.

Perez, S., "Google Adds 20 Museums to Indoor Google Maps, Says More on the Way", Tech Crunch, Jul. 10, 2012, http://m.techcrunch.com/2012/07/10/google-adds-20-museums-to-indoor-google-maps-says-more-on-the-way/.

Spingram-Koff, J., "CrownCam: crowdsourced mobile video stream for journalistic applications", Mozilla Drumbeat, May 2011, https://drumbeat.org/en-US/challenges/unlocking-video/submission/61/.

* cited by examiner

SENSOR DATA AGGREGATION SYSTEM

This application claims priority to the following U.S. provisional applications: 61/656,619 filed Jun. 7, 2012; 61/675,268, 61/675,263, 61/675,258, and 61/675,271 filed Jul. 24, 2012; and 61/676,426, 61/676,431, 61/676,436, 61/676,443, and 61/676,452 filed Jul. 27, 2012. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is data collection and management technologies.

BACKGROUND

The background description includes information that may be useful in understanding the present invention. It is not an admission that any of the information provided herein is prior art or relevant to the presently claimed invention, or that any publication specifically or implicitly referenced is prior art.

Many people have put forth effort toward reality mining where data is collected from a user's cell phone to learn more about the user. For example, recent work at MIT attempts to identify a user's behaviors or social network via observing patterns of use (see URL reality.media.mit.edu/dataset.php).

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Interestingly, little to no effort has been directed to aggregating ambient data for a crowd of individuals. The Applicant has appreciated that aggregation of sensor data from a crowd, possibly at an event (e.g., sporting event, concert, etc.), provides valuable insight into a crowd dynamic or can be monetized.

Thus, there is still a need for systems and methods by which one can aggregate sensor data from a crowd.

SUMMARY OF THE INVENTION

The inventive subject matter provides apparatus, systems and methods in which one can leverage a sensor data aggregation system to construct an event feed from a plurality of sensing devices. One aspect of the inventive subject matter includes a sensor data aggregation system that comprises a sensor interface and an aggregation server. The sensor interface can be configured to acquire or otherwise obtain sensor data from one or more sensing devices. For example, sensor data can be obtained, possibly over a network (e.g., the Internet, cellular network, WWAN, etc.), from smart phones or even security cameras. In more preferred embodiments, the sensor data is associated with an event, possibly a sporting event or concert. The aggregation server receives the sensor data and aggregates the sensor data from the sensing devices to form an event feed. In some embodiments, the aggregation server establishes an event policy that governs how the event feed should be constructed. The event policy could be established automatically, by an event owner, by individuals acquiring the sensor data, by those observing the event feeds, or by other techniques. Regardless of how the event policy is established, the aggregation server constructs the event feed according to the rules in the event policy and from the sensor data. The aggregation server can then provide the event feed to one or more output devices and can instruct the output devices to present the event feed to one or more users. The output devices can include computers, printers, tablets, kiosks, cell phones, or other types of computing devices.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
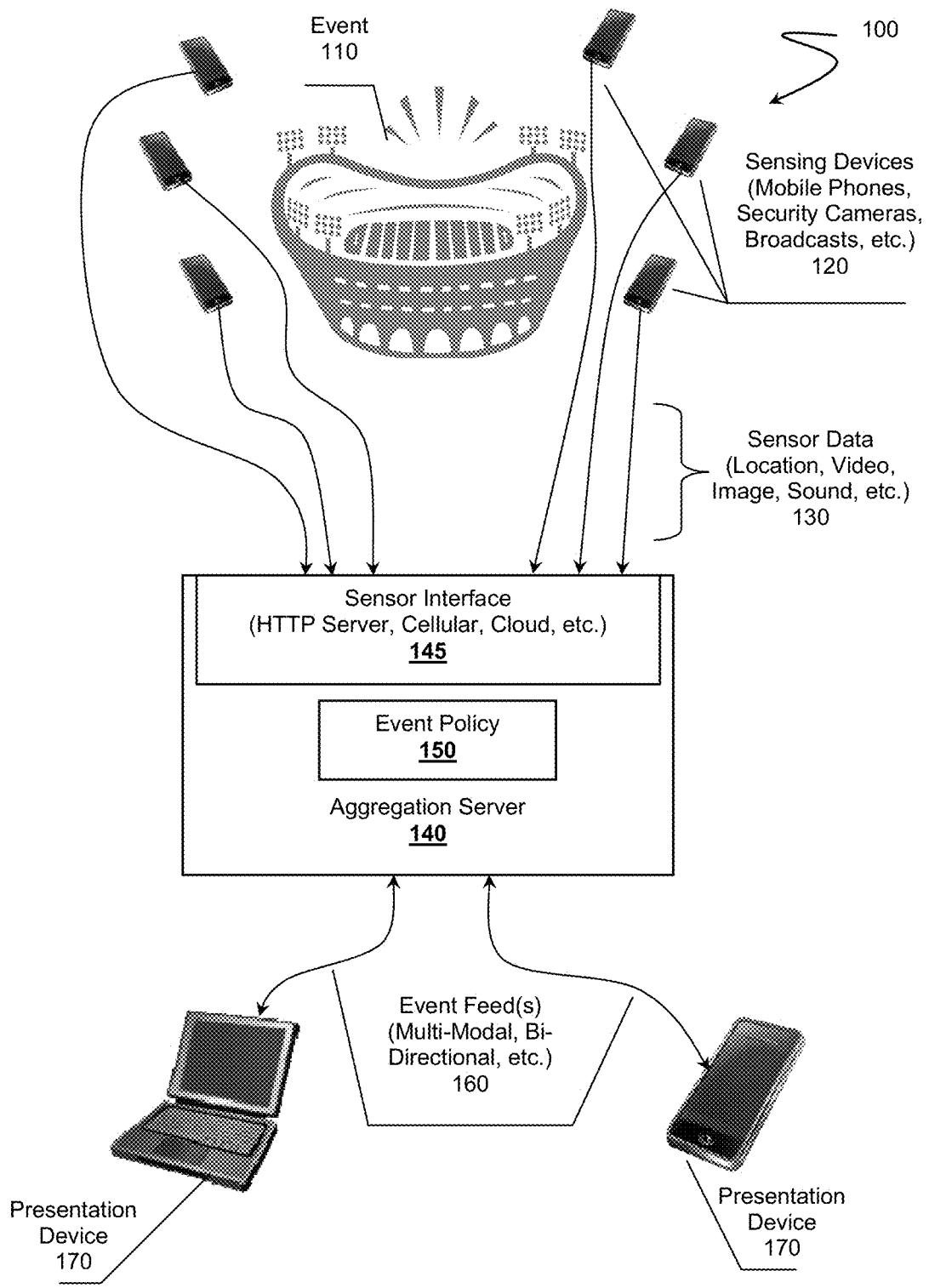
FIG. 1 is a schematic of sensor data aggregation system.

It should be noted that while the following description is drawn to a computer/server based sensor data management system, various alternative configurations are also deemed suitable and may employ various computing devices including servers, interfaces, systems, databases, agents, peers, modules, engines, controllers, or other types of computing devices operating individually or collectively. One should appreciate such terms are deemed to computing devices comprising at least one processor configured or programmed to execute software instructions stored on a tangible, non-transitory computer readable storage medium (e.g., hard drive, solid state drive, RAM, flash, ROM, distributed memory, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including aggregating sensor signals from multiple sensors and generating one or more network signals capable of configuring devices to present information related to the sensor signals.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, within the context of this document the terms "coupled to" and "coupled with" are used euphemistically to mean "communicatively coupled with" over a network, where two or more devices are able to communicate with each other over the network, possibly via one or more intermediary devices.

Overview

One should appreciate that the disclosed systems and method allow users to remotely participate in an event from anywhere in the world. The participation in the event can be substantially in real-time, gradual, or even delayed as desired by the individual participants. Such techniques give rise to the spawning of spontaneous social groups, settings, or experiences through the system's own social sharing capabilities as well as via all other social media (e.g., Facebook®, Twitter®, Pinterest®, future social networks, etc.). For example, virtual flash mobs, people of common interests, or other groups can be brought together around a live or even recorded event as if remote individuals were there at the time of the event. Through the use of sensor technology deployed in devices such as smart phones, watches, eyeglasses, clothing, or other sensing device, sensor data or other experiences can be created live, utilized, stored, or shared for many purposes. Example experiences that can benefit from such techniques include entertainment, games, movies/filmmaking, pictures, 3D experiences or hologram/media, health applications, tasting food remotely, exercising remotely, news information and news networks, shopping and commerce—flash mob live shopping event at Tiffany's with girls directing virtual shoppers, or other events.

Ecosystem

In FIG. 1, system 100 represents a sensor data aggregation system. Contemplated systems include sensor interface 145 (e.g., HTTP server, cellular network, WWAN, etc.) configured or programmed to acquire sensor data 130 from a plurality of sensing devices 120 possibly proximal to event 110. Sensor data 130 can be sent or otherwise transmitted from sensing devices 120 over a network (e.g., Internet, cellular network, LAN, VPN, WAN, parts of a personal area network, etc.) to aggregation server 140 that is preferably configured or programmed to aggregate sensor data 130 into one or more of event feed 160 according to event policy 150 and based on sensor data 130. Event feed 160 can then be transmitted to one or more presentation devices 170 (e.g., computers, tablets, game consoles, game handhelds, cell phones, appliances, vehicles, etc.).

One should appreciate that the disclosed techniques provide for construction of a lifelike or virtual experience of event 110 where individuals operating presentation devices 170 lack access to event 110 can feel like they are participating in event 110 through reception of event feed 160. Event feed 160 can include a wide spectrum of modalities constructed from sensor data 130, thus creating an ultra-rich, omni-sensory experience; an experience that can quite possibly exceed the experience of individuals actually at event 110 because remote individuals are able to consumer event feed content from numerous simulations perspectives as governed by event policy 150.

Individuals or entities controlling sensing devices 120 can be considered broadcasters for event 110. The broadcasters collect sensor data 130 can cause sensor data 130 to be transmitted to aggregation server 140. In some embodiments, broadcasters can be paid a fee in exchange for their services. Further, viewers interacting with event 110 via presentation devices 170 can engage one or more broadcasters, possibly in exchange for a fee (e.g., account transactions) to give rise to a dynamic social experience.

Although event 110 is illustrated as a sporting event, one should appreciate that event 110 can include a wide variety of experiences. Examples of event 110 can include a concert, a sporting event, a game (e.g., board game, poker game, video game, etc.), a vacation, a disaster, a news story, an expedition, a traffic event, a live event, a flash mob, a shopping event, a reality event, an accident, a medical emergency, a golf outing, a party (e.g., birthday party, social gather etc.), a premier, a funeral, a memorial, a commute, or other types of event. Event 110 can be directly experienced by any number of sensing devices 120 associated with any number of individuals at event 110. For example, event 110 might include just a few people shopping together, each with their own cell phone operating as sensing device 120. In other scenarios, a concert for example, event 110 can include thousands, tens of thousands, or more individuals where sensor data 130 is collected and delivered to aggregation server 140 via a homogenous or heterogeneous mix of thousands of cell phones, cameras, security systems, weather sensors, or other sensing devices.

One should appreciate that the nature of event 110 can impact acquisition of sensor data 130, features of event policy 150, delivery of event feed 160, or other aspects of system 100. Event 110 can have a corresponding event object stored within a memory aggregation server where the event object comprises event attributes describing the nature of event 110. The event objects can be instantiate before occurrence of event 110, possibly by an event manager, or could be instantiated by aggregation server 140 automatically based on observations of sensor data 130. For example, aggregation server 140 can operate according to an event object instantiation rules set that automatically generates an event object when sensor data 130 satisfies specified criteria. Example criteria might depend on a number of sensor data feeds originating proximal to a GPS coordinate. When sensor data 130 satisfies the event object instantiation rules, aggregation server 140 can then instantiate a corresponding event object. Event objects can be instantiated or populated with event attributes that then impact the aspects of the system where such impacts flow through to the end user at presentation devices 170

Even attributes describe the nature of corresponding event 110. Event policy 150 could operate as a function of the event attributes, which impact how event feeds 160 are curated. Example event attributes include geo-location coordinates, time stamps, event ownership information, number of transmitting devices, maximum allowed device, digital rights management information, security triggers or models, cryptographic requirements, fees or subscription information, type of event, name of event, event affiliation, sponsorship information, advertising information, duration of event, or other types of event related information.

Sensing devices 120 associated with event 110 can also include a broad spectrum of devices. Examples sensing devices 120 can include a vehicle, a cell phone, a pair of eyeglasses, a tablet, a security camera, a game console, or other devices configured to acquire sensor data 130. For example, a vehicle involved in a rally race might include an accelerometer, a temperature gauge, a gas gauge, tire pressure gauge, a GPS sensor, a microphone, a camera, or even a keyboard for entering data. During the race, the rally car operates as sensing device 120 can provide sensor data 130. All sensors are contemplated including mechanical sensor, biometric sensors, chemical sensors, weather sensor, radar, infrared sensors, or other types of sensors that can construct sensor data 130.

In a similar vein, sensor data 130 represent modalities of human experience including modalities outside the ordinary human senses. Example modalities include time data, location data, orientation data, position data, acceleration data, movement data, temperature data, metadata, user data, health data, olfactory data, sound data, kinesthetic data, image data, video data, metric data, biometric data, or other types of modal data. Similarly event feeds 160 generated by aggregation server 140 can also represent event feeds 160 according to such modalities, even if the modality is not present in the sensor data. Thus, aggregation server 140 can convert sensor data 130 from one modality to another modality based on the requirements set forth within event policy 150. For example, if sensor data 130 comprises a raw video feed without sound, event feed 160 can include additional audible commentary data that is injected into or overlaid on event feed 160 by aggregation server 140 according to event policy 150.

In view that sensor data 130 can originate from many different sensing devices 110, one should appreciate that event feed 160 can include multiple viewing levels based on one or more data streams. Event feed 160 can comprise one or more data streams that are constructed from sensor data 130, possibly in real-time. In some circumstances, event feed 160 could be comprises a single data stream (e.g., an HTTP data feed) of sole event 110. In other circumstances, event feed 160 include multiple data streams, possibly multiple TCP/IP sessions that can represent a single event feed or can represent many different events. In such cases, presentation devices 170 are able to present a "zoomed out" view of many different available events.

Figure 2:
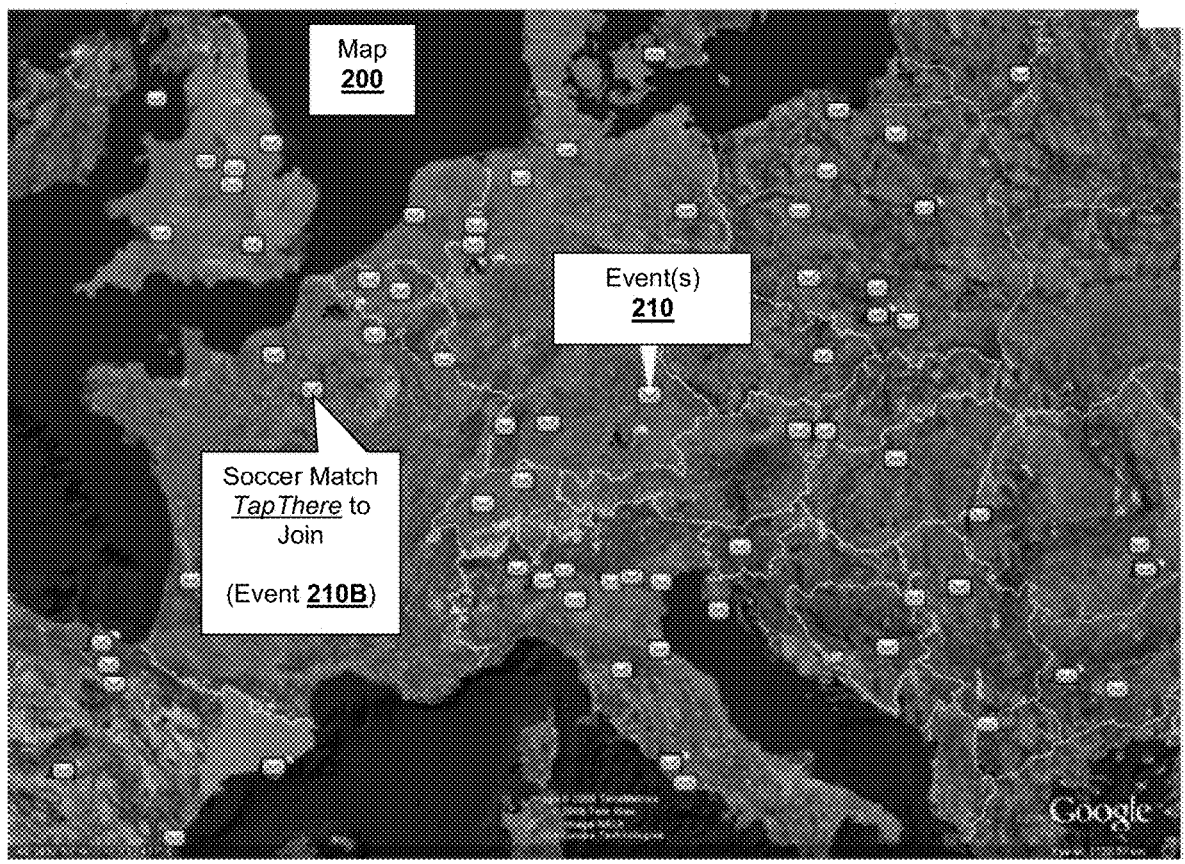
FIG. 2 is an example of a world-view indicating available events having event feeds.

A zoomed out view is shown in FIG. 2, where one can view a portion of a world map 200 to see if or where one or more events 210 on the individual's presentation device. In this example, map 200 presents a multitude of events 210 occurring thorough out Europe. The presentation device can receive the event information from the aggregation server as a single stream transporting information on multiple events. As the individual interacts with events individual, they can be presented more detailed information as indicated by event 210B. The superimposed caption presents additional information related to the specific event and can include a link (i.e., the underlined "TapThere" link) to allow the presentation device to interact with the specific event. Contemplated captions can be superimposed on maps, an augmented reality overlay on a displayed image of a real-world scene, or integrated in to a computer game.

Figure 3:
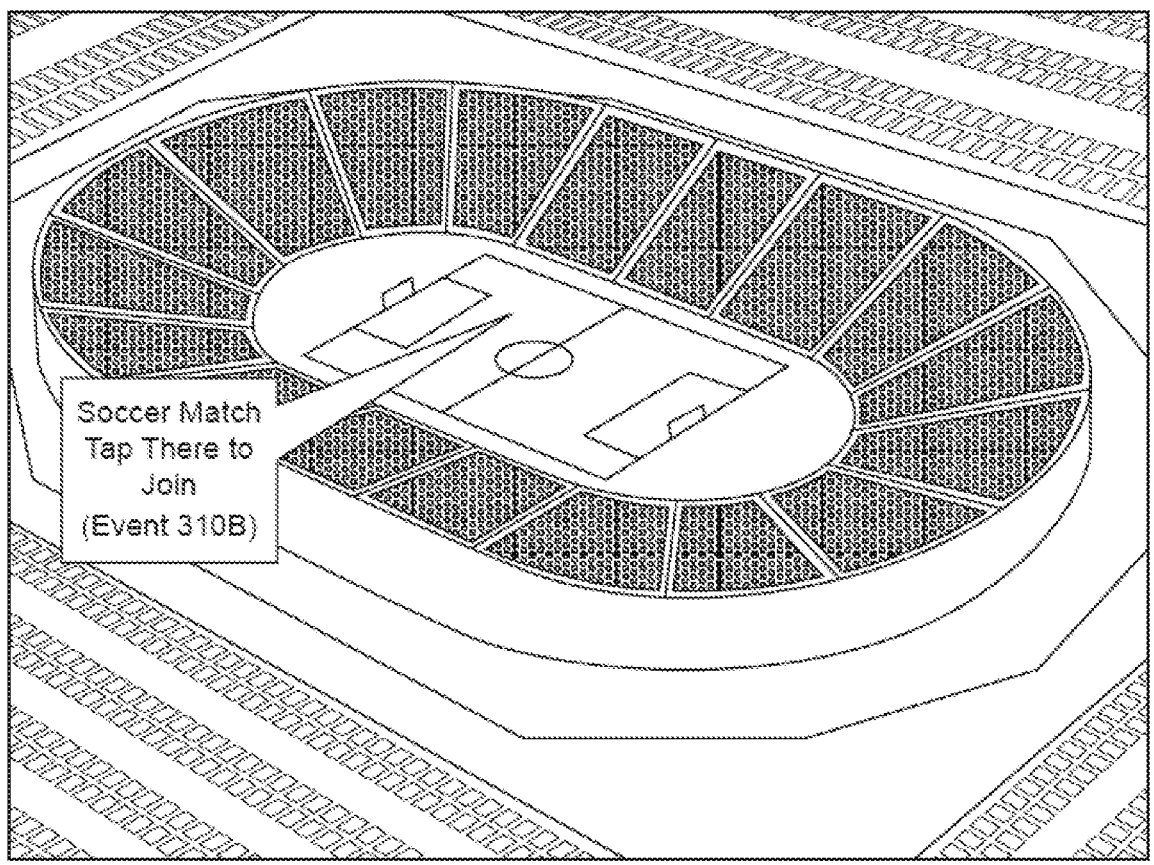
FIG. 3 is an example of a "zoom" in of an available sporting event.

Event feeds can be viewed from many different viewing level that allow for zooming into an event, possibly where the sensor data enables the aggregation server to stitch the sensor data together to form a zoom-able event feed. FIG. 3 illustrates a "zoom" in on event 310B from FIG. 2. One can view potential areas to view by an interactive map as shown in FIG. 2. For example, one can select desired criteria for searching for available events or event feeds possibly by events tagged/grouped to a band, a person, a keyword, metadata, individuals present at the event, celebrity, or other factors. Further, one can choose how old the event feed is, thus allowing an individual to replay old events. Still further, one can choose by the person broadcasting (follow certain people who broadcast well and rank high amongst a peer rating system), or by quality of the event feed or its associated data.

Figure 4:
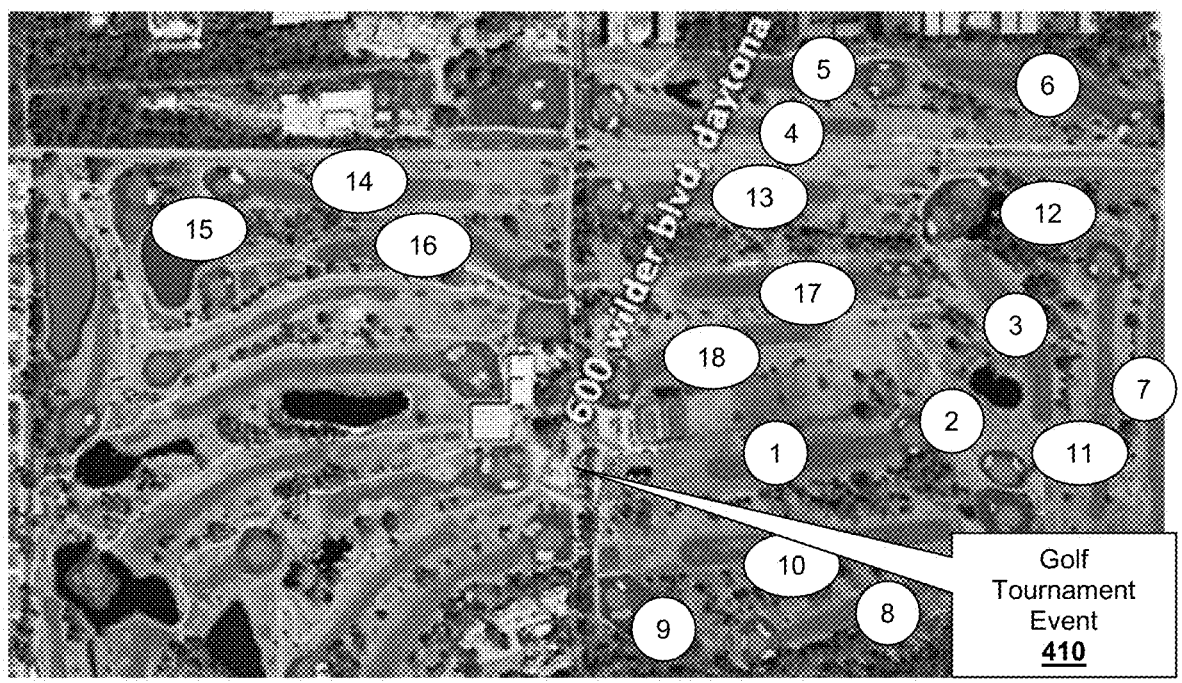
FIG. 4 illustrates that an event can have zones of interest.

FIG. 4 illustrates that events 410 can be broke down into event zones of interest possibly presented with color codes or other indicia. In the example shown, the zones of interest are where players of a golf tournament are currently located or playing and labeled according to the golf course's holes. An individual can select one or more event zones to engage with event 410. In some embodiments, event 410 can be presented via multiple screens, cell phone and television perhaps, that allow a remote viewer to select an icon or other indicia on one screen to engage with event feeds via another screen. Event 410 can be presented as multiple live substantially real-time feeds to an individual via all registered presentation devices. The live event feeds can present indications of trending events (rating system) based upon popularity, positions of potential broadcasters open for bid/hire who will capture content in exchange for a fee, positions of potential live participating broadcasters known by participants (e.g., Facebook friends, Twitter friends, Pinterest friends, etc), or broadcaster that one can follow or "friend" or have followed in the past, who will capture event data.

As one zooms in or out, or from one feed to another, the system employs a smoothing process (e.g., Bresenham scaling, bilineal interpolation, feature-based image metamorphosis, etc.) is used to provide a seamless picture quality when a viewer is watching an event feed broadcast. Should the broadcaster stop broadcasting a specific sensor data—in this case defaults/preferences can be set to default to the next closest camera/broadcaster based on proximity or orientation of the sensor feed relative to the event. Because pictures and video are taken of an event objects (e.g., a person, a vehicle) from multiple angles, a 3D virtual reality or virtual "hologram" can be rendered. Thus the resulting event feed can comprise a multi-dimensional representation of the event. The multi-dimensional representation can include one, two, three, or more dimensions. A four dimensional representation could include a 3D rendering, possibly a voxel-based rendering, that can change in time. The dimensionality can be further extended into other senses, possibly including kinesthetic (e.g., vibration, force feedback, etc.), smell, taste, or other dimensions. Therefore, the event feed could include non-spatial or non-time related dimensions.

In some embodiments, events can be identified by contextual information related to the event, possibly based on social groups. As an example one could construct an event feed that operates or comprises a documentary. Such a use-case can be constructed from sensor data associated with a group of one or more individuals where the sensor data is compiled, according to an appropriate event policy, to present "day-in-the-life-of" content. Such content might be associated with a city, group, person, or event at a university; University of Southern California for example. Example groups that are considered of interest include a social group, a spontaneous group, a clique, a family, an organization, a band, a mob (e.g., flash mob, etc.), a crowd, a sports team, an entourage, a company, or other group.

Figure 5:
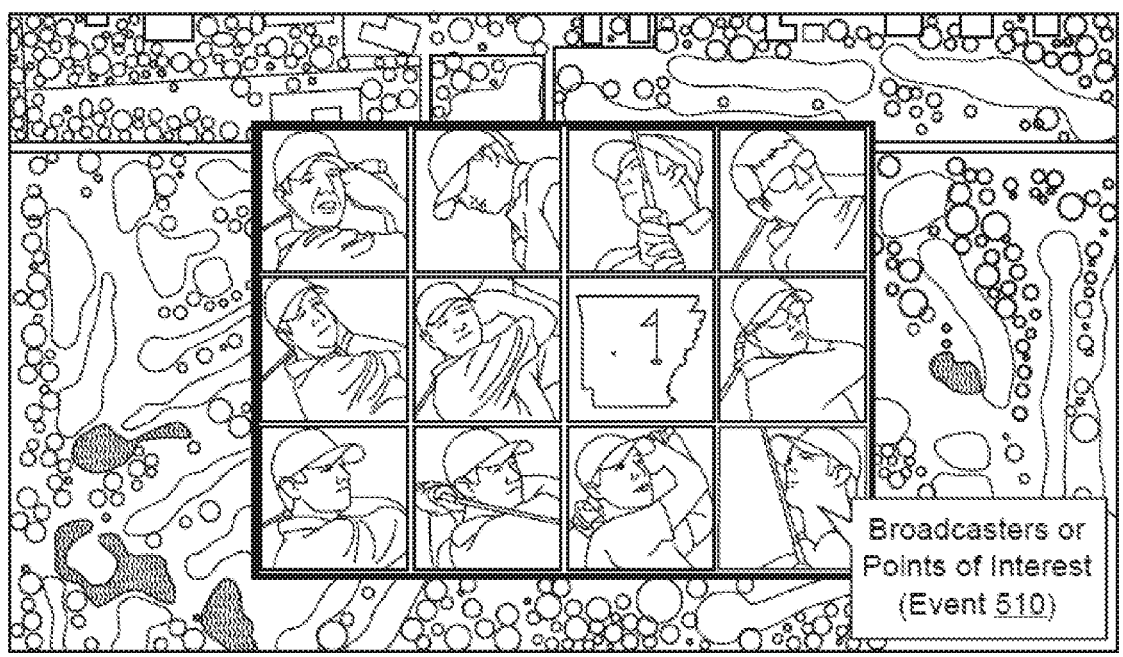
FIG. 5 illustrates an event feed as having multiple feeds associated with available people of interest.
Figure 6:
FIG. 6 illustrates an event feed having image data for specific individuals.

FIGS. 5 and 6 illustrates event feeds from specific individuals that could be broadcasters or could be people of interest. Specific people, events, topics, or other items of interest can be designated wherein the viewer can either search for these or watch live. Further the event feed or portions of the event feed can be recorded for later viewing. Broadcasters, or potential broadcasters, or their devices can receive requests from viewers, can automatically attempt to film items of interest, or can communicate via a bid/auction process to determine if the broadcaster or broadcasting device will actually broadcast per the request at event 510. Actual pictures of what a viewer is hoping to receive (see FIG. 6 indicating a picture of interesting people) can be transmitted to a potential broadcaster where the broadcaster, via facial recognition, optical recognition, audible recognition technology or other sensory technology, can then to find the item of interest. When found, the sensor data associated with the item of interest can be sent to the aggregation server. For example celebrities can be spotted from a crowd or event (again see FIG. 6), and viewers can request that potential broadcasters with a certain proximity of an event (GPS) broadcast the celebrity once spotted. Such an approach gives rise to a worldwide user generated or even crowd generated news broadcasts. Further, the disclosed technique can be considered as a form of virtual paparazzi where remote viewers, in some sense, construct a virtual presence through which they are able to capture data about their favorite personages.

An event feed is considered a dynamic feed allowing remote viewers to interact, possibly bi-directionally, with the aggregation server, sensing devices, other viewers, or even broadcasters. For example, one can request that an entity in the event area film an item of interest, possibly where the request includes a payment perhaps generated from an "auction" or "request/bid" process, wherein potential broadcasters agree to film. Such requests are brokered by the aggregation server and can be quite specific, including a topic, a celebrity, a specific area/GPS location, a camera angle, sensing device commands (e.g., movement, positions, focus, etc.), or other type of "direction". One can also submit trigger criteria to the aggregation server or even the sensing devices where the trigger criteria cause a capture of the sensor data or even generation of the event feed. For example, the trigger criteria might cause a smart phone or even Google® Glass™ to capture sensor data as triggered by light, time of day, heart rate from heart monitor, altimeter, movement of broadcasting device/gyroscope, noise level, facial recognition, biometric information, movements, hand waving, other crowd movements, once a particular person or event starts, once certain noise levels are reached, or other sensory data that the broadcasting device or attachments can measure.

One should appreciate that the viewers or other remote individuals can provide direction to those in the area, where the direction provides instructions or requests on capturing sensor data via the aggregation server back to the broadcasters. Thus the event feed can comprise a directed feed under the direction of a plurality of end users. The directed feed could be constructed from an individual, based on ratings from the end users, based on votes, or other factors. Further, the sensor data might originate from one or more sensor feed points that represent a specific sensing device or sensor. For example, a feed point might include a specific individual's cell phone at the event. To create further incentives for the owner of the cell phone the feed point might have a monetary value representing the value of the feed point with respect to capturing the data. A cell phone closest to a stage might have a higher monetary value while a cell phone farther away might have a lesser monetary value. The monetary value of the feed point could comprise a flat fee, a subscription, a bid, a per-use charge, a location charge, a position charge, a tax, a data quantity charge, a sales tax, or other values.

The remote viewer, as well as others, possibly Facebook or other social media friends, can remotely control the broadcasting sensing device. Thus creating a social/friend experience as if they were there together. Such an approach provides for construction of a curated event feed or curated sensor data. As requests come in from the viewership, the aggregation server relays the requests, possibly after constructing an auction, from the end user or users to the sensing devices. If the request is picked up or otherwise accepted, then the resulting sensor feed or event feed is curated by the viewing masses. Further, the curated feeds can be considered for-fee curated feeds when payment is involved. One should appreciate that such curated feeds can be curated by the end users, according to the event policy, by the individuals at the event, according to whims of the crowd, or other parameters.

Figure 7:
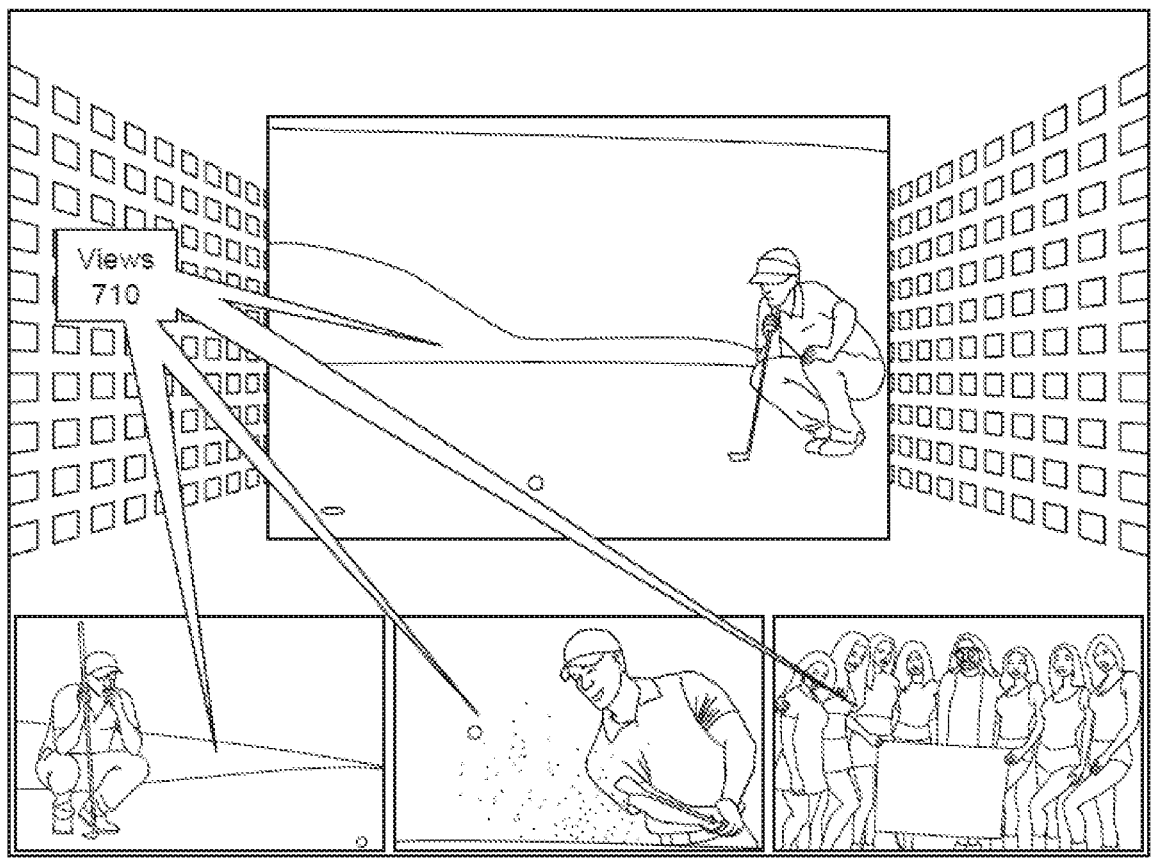
FIG. 7 illustrates that an event feed can include many different views.

FIG. 7 shows an event feed comprising many different views 710 of an event; a golf tournament in this case. One should appreciate that a "view" is considered to cover the concept of different modalities beyond the just visual modality. For example, one "view" might include a representation of event temperature data. Views 710 can be considered a crowd curated version of the event data. Many views 710 can be shown and engaged by remote participants where each view can be considered an individual manageable view objects with respect to the presentation devices. Thus, the aggregation server can construct an interface (e.g., API, GUI, etc.) that allows the viewers to interact with views 710 collectively or individually. Broadcasts can be organized and access in many ways subject to restrictions of a corresponding event policy if any. A ranking algorithm determines what broadcasts are trending and popular, as well as may be interesting to a viewer based upon their profile. The ranking algorithm can operate as a function of the number of subscribers to a view, amount of money exchanged with respect to the view, number of likes or dislikes, or other factors. Thus, the aggregation server can include one or more trending modules that monitor number of active viewers, votes, ratings, ranks, or other type of metric data that can be used to establish a trend.

As discussed previously, the views of an event feed can be governed by one or more event policies. An event policy comprises one or more management functionalities that can dictate how the sensor data is distributed as the event feed. In some embodiments, the event policy might be non-existing or weakly enforced without substantial interact with the sensor data. For example, an event policy of a birthday party might allow aggregation of all data as an event feed with no filtering or editing. However, a sporting event such as a USC Trojan's Rose Bowl event might require specific management to ensure digital rights are enforced properly. Therefore, the event policy can comprise rules from one or more participants in the ecosystem. Event policies can represent rules from an owner of the event, from an end user, from rules generated automatically from multiple users (e.g., votes, requests, ratings, etc.), or from other entities. Example management functionality within an event policy can include prioritizing content, filtering content, injecting content, deleting content, routing cogent, sharing content, authorizing content, managing content, curating content, scheduling content, programming content, analyzing content, or other types of management. Through such techniques, the event feed can be quite a dynamic, social experience for participants.

Figure 8:
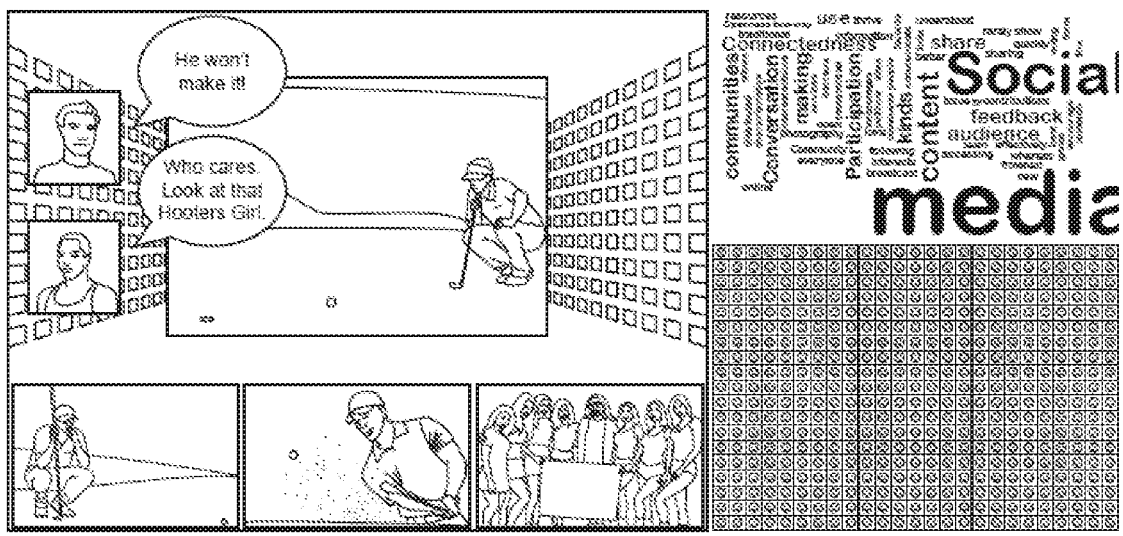
FIG. 8 illustrates an event feed consumed by multiple viewers where the viewers can interact with each other and the feed.

FIG. 8 illustrates a possible shared experience among end users. The remote viewers, as well as others (such as Facebook/social media friends) can remotely control the broadcasting device to construct a desirable event feed as illustrated thereby creating a social/friend experience as if they were there together. In the example shown, the two individuals are participating in a golf event where the event feed indicates at least a portion of the crowd has a different focal point than the main event; the focal point being the girls rather than the golfers.

One should appreciate that the inventive subject matter is also considered to include identification or even discovery of focal points within event other that the main event. For example, an audience at an outdoor concert would likely have a core or main focal point on the stage. However, other minor focal points might arise and become of interest to remote participants; perhaps a person dancing to the music of interest. The aggregation server can identify the focal point by monitoring the sensor data stream possibly by determining locations of sensing device and their position or orientation. To continue the example of the dancer, the aggregation server might detect that a threshold number of cell phones are pointed at a common location other than the stage. The aggregation server can then take the sensor data from the cell phones to construct a view within the event feed corresponding to the dancer focal point. Thus, the focal point can be considered a crowd or mob focal point. Such focal points can comprise sensor data related to at least one of a topic, a celebrity, a sub-event, a location, an area, an object, or other item of common interest.

As the aggregation server delivers the event feed, the server can apply one or more algorithms to take input from viewer who can rate/dynamically rate broadcasters, broadcasts, or other items in the event feed. Such metrics can then provide useful trending information to viewers to provide the best viewing experience. For example, a minor focal point might arise dynamically and then the ratings of the minor focal point could trend upwards, which causes its presence in the event feed to become more prevalent. Such metric data can also be used for various forms of event analytics. Contemplated analytics can be used to generate advertising revenue, provide an indication of problem areas at event locations, identify broadcasters of high interest, identify active viewers, determine demographics, or other interesting purposes.

Still further, the disclosed techniques give rise to dynamic social sharing. Viewers can interact, share, or rate via avatars on screen and other means as illustrated in FIG. 8. Ecommerce activities can be triggered by this activity just as it would if people were actually physically at an event. Thus the event feed can comprise various forms of transaction data including commercial transaction data. For example, the event feed can include product information or vendor information where the product can be purchased. Further, the event feed can include account information by which a participant can purchase the product. Example transaction data can represent an account, a good, a service, an advertisement, a purchasable product, or other types of items.

Figure 9:
FIG. 9 illustrates that individuals capturing sensor data of an event can receive feedback based on one or more event feed metrics.

As illustrated in FIG. 9, broadcasters, or other individuals capturing sensor data, can receive dynamic feedback; possibly before, during, or after capturing the sensor data. In the example show, a broadcasting using their cell phone as a sensing device receive trending information, ratings, number of viewers, incoming requests, auction information, or bid data. All types of feedback are contemplated. Further, the feedback can include alerts, request for capturing data associated with items in their area based on GPS coordinates, or other factors. In some embodiments, the media can submit bids to broadcasters to capture data. For example, TMZ® might submit one or more bids, or other form of payments, to individuals at an event where the payments indicate a desire for requested videos or pictures. Such an approach is considered useful for capturing information associated news event, celebrities, film projects, or other activities. An astute reader will appreciate the disclosed techniques give rises to altering the perception of the world through live, truthful broadcasting.

The disclosed techniques have many use-cases beyond those discussed above. One possibility can include using the incentive mechanisms to search for lost children. Broadcasters are incentivized to capture sensor data where a child may have been lost and viewers are incentivized to monitor event feeds to see if they can spot the child. In a different vein, an event televised on ESPN® could include views of an event feed of people participating in a tailgate party that might be of interest to the viewership.

The sensor data aggregation system can also be considered as a virtual sensor array management system. The aggregation server can monitor sensor feeds from many devices and identify an event possibly in real-time. The aggregation server can then construct a virtual sensor array from the available sensing devices proximal to the event, or simply related to the event. The virtual sensor array can be bound together possibly through a hierarchal addressing scheme or through other organization structures. For example, the aggregation servers could arrange the virtual array according to modality of sensor data, relative location to one or more focal points, according to broadcaster ratings, or other scheme. In such embodiments, the aggregation server can function as a virtual sensor array management engine that maintains, to within bounds of any pending event policy, coherency of the array. Management capabilities can include adding sensing devices to the array, removing sensing devices from the array, filling gaps in sensor data (e.g., stitching, interpolation, etc.), requesting new sensing devices, maintain rights, or other actions. One should appreciate that the virtual sensor array can be quite dynamic that changes with time.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for aggregating sensor data at an event, the system comprising:
    a sensor interface configured to acquire sensor data from a plurality of sensing devices at an event, wherein the sensor data is captured by a plurality of persons operating the plurality of sensing devices,
        wherein the plurality of sensing devices are selected from the group consisting of: sensor-enabled smartphones, sensor-enabled watches, sensor-enabled eyeglasses, network-connected security cameras, and sensor-enabled clothing; and
    an aggregation server coupled with the sensor interface and configured to:
        aggregate the sensor data from the plurality of sensing devices;
        establish an event policy governing dissemination of the sensor data, wherein the event policy derived from information provided by at least one of (a) an event owner and (b) the plurality of persons;
        group the aggregated sensor data into a plurality of focal points, wherein aggregated sensor data for each of the plurality of focal points share a common sensed location, wherein each focal point of the plurality of focal points comprises a discrete common sensed location, and wherein the aggregated sensors for each of the plurality of focal points are directed towards a common item of interest;
        construct a main event feed based on the event policy, wherein the event feed comprises views of discrete focal points, and wherein the main event feed further comprises a three-dimensional representation of the event,
        receive one or more crowd-sourced instruction to remotely control at least one of the plurality of sensing devices towards one or more selected focal points;
        aggregate the one or more selected focal points; and
        generate event temperature data from the analyzed one or more selected focal points.

2. The system of claim 1, wherein the event includes at least one of the following: a concert, a sporting event, a game, a vacation, a disaster, a news story, an expedition, a traffic event, a live event, a flash mob, a shopping event, a reality event, and an accident.

3. The system of claim 1, wherein the sensing devices comprise at least one of the following sensor platforms: a vehicle, a cell phone, a pair of eyeglasses, a tablet, a security camera, and a game console.

4. The system of claim 1, wherein the event policy represents rules from the event owner.

5. The system of claim 1, wherein the event policy represents rules from the end user.

6. The system of claim 1, wherein the event policy represents rules automatically generated according to a plurality of end users.

7. The system of claim 1, wherein the aggregation server is further configured to allow the end user to construct a desirable event feed from at least two discrete focal points of the main event feed.

8. The system of claim 1, wherein the aggregation server is programmed to automatically identify a focal point as a function of a location, position, and orientation of at least some of the plurality of sensing devices.

9. The system of claim 1, wherein the aggregation server is further configured to alter a prevalence of a view of a corresponding focal point as a function of received ratings of the corresponding focal point.

10. The system of claim 1, wherein the sensor data comprise multi-modal data.

11. The system of claim 10, wherein the sensor data comprises at least one of the following types of data: time data, location data, orientation data, position data, acceleration data, movement data, temperature data, metadata, user data, health data, olfactory data, sound data, kinesthetic data, image data, video data, metric data, and biometric data.

12. The system of claim 1, wherein the main event feed comprises multiple viewing levels.

13. The system of claim 12, wherein the multiple viewing levels support zoom.

14. The system of claim 12, wherein the multiple viewing levels comprise image data stitched together from at least some of the aggregated data.

15. The system of claim 1, the aggregation server is further configured to relay sensor data request from the end user to at least one of the plurality of sensing devices.

16. The system of claim 15, wherein the sensor feed comprises curated data.

17. The system of claim 16, wherein the curated data is curated by end users.

18. The system of claim 16, wherein the curated data is for-fee curated data.

19. The system of claim 1, wherein the main event feed comprises a bi-directional feed.

20. The system of claim 1, wherein the three-dimensional representation of the event can further comprise a fourth dimension.

21. The system of claim 1, wherein the main event feed comprises transaction data.

22. The system of claim 21, wherein transaction data relate at least one of the following: an account, a good, a service, an advertisement, and a purchasable product.

23. The system of claim 1, wherein the plurality of sensing devices form a virtual sensor array.

24. The system of claim 23, wherein the aggregation server is further configured to manage the virtual sensor array.

25. The system of claim 1, wherein the main event feed comprises a documentary.

26. The system of claim 25, wherein the documentary comprises sensor data from a group of users associated with the sensing devices.

27. The system of claim 26, wherein the group comprises at least one of the following: a social group, a spontaneous group, a clique, a family, an organization, a mob, a crowd, a sports team, an entourage, and a company.

28. The system of claim 1, wherein the main event feed comprises a substantially real-time feed.

29. The system of claim 1, wherein the event policy comprises rules governing distribution of the main event feed.

30. The system of claim 29, wherein the rules provide for at least one of the following feed management functionalities: prioritizing content, filtering content, injecting content, deleting content, routing cogent, sharing content, authorizing content, managing content, curating content, scheduling content, programming content, and analyzing content.

31. The system of claim 1, wherein the main event feed comprises an indication of at least one focal point.

32. The system of claim 31, wherein the at least one feed point comprise a monetary value.

33. The system of claim 32, wherein the monetary value comprises at least one of the following: a flat fee, a subscription, a bid, a per-use charge, a location charge, a position charge, a tax, a data quantity charge, and a sales tax.

34. The system of claim 1, wherein the aggregated sensor data comprises a directed feed.

35. The system of claim 34, wherein the directed feed is constructed on direction of a plurality of end users.

36. The system of claim 1, wherein the three-dimensional representation of the event is used to overlay one or more graphical elements in an augmented reality system.

* * * * *